(12) United States Patent
Kroeger et al.

(10) Patent No.: US 11,408,341 B2
(45) Date of Patent: Aug. 9, 2022

(54) ANTI-ICING SYSTEM FOR AN AIRCRAFT NACELLE

(71) Applicant: Rohr, Inc., Chula Vista, CA (US)

(72) Inventors: Daniel Kroeger, San Diego, CA (US); Michael S. Pretty, Jamul, CA (US); Jihad Ramlaoui, Chula Vista, CA (US)

(73) Assignee: Rohr, Inc., Chula Vista, CA (US)

( * ) Notice: Subject to any disclaimer, the term of this patent is extended or adjusted under 35 U.S.C. 154(b) by 395 days.

(21) Appl. No.: 16/180,684

(22) Filed: Nov. 5, 2018

(65) Prior Publication Data

US 2020/0141317 A1    May 7, 2020

(51) Int. Cl.
*F02C 7/047*    (2006.01)
*B64D 33/02*    (2006.01)

(52) U.S. Cl.
CPC .............. *F02C 7/047* (2013.01); *B64D 33/02* (2013.01); *B64D 2033/0233* (2013.01); *F05D 2220/323* (2013.01); *F05D 2260/60* (2013.01)

(58) Field of Classification Search
CPC ........ F02C 6/08; F02C 7/047; F05D 2240/91; B64D 2033/0233; B64D 15/00; B64D 15/02; B64D 15/04; F01D 25/02; F01D 25/10; F01D 25/14; F01D 25/26
See application file for complete search history.

(56) References Cited

U.S. PATENT DOCUMENTS

| | | | |
|---|---|---|---|
| 3,933,327 A | 1/1976 | Cook et al. | |
| 4,674,714 A * | 6/1987 | Cole | B64D 15/04 138/104 |
| 5,011,098 A | 4/1991 | McLaren et al. | |
| 5,088,277 A * | 2/1992 | Schulze | B64D 15/04 244/134 R |
| 5,370,427 A * | 12/1994 | Hoelle | F16L 27/11 285/226 |
| 5,400,984 A * | 3/1995 | Arnold | B64D 15/04 244/134 B |
| 6,354,538 B1 | 3/2002 | Chilukuri | |
| 7,900,872 B2 | 3/2011 | Stemberger | |
| 8,047,470 B2 * | 11/2011 | Porte | B64D 15/04 244/134 B |

(Continued)

FOREIGN PATENT DOCUMENTS

| | | |
|---|---|---|
| EP | 1318283 A1 | 6/2003 |
| FR | 2961174 B1 | 7/2012 |

OTHER PUBLICATIONS

EP search report for EP19207274.2 dated Feb. 7, 2020.

*Primary Examiner* — Todd E Manahan
*Assistant Examiner* — Sean V Meiller
(74) *Attorney, Agent, or Firm* — Getz Balich LLC (57) ABSTRACT

An anti-icing system for an aircraft nacelle includes an inner duct and an outer duct. The inner duct extends through a first bulkhead between a gas turbine engine and a plenum of the nacelle. The inner duct is configured to deliver heated gases from the gas turbine engine to the plenum. The outer duct includes a first end and a second end. The outer duct circumferentially encompasses at least a portion of the inner duct on a first side of the bulkhead. At least one of the first end and the second end of the outer duct is mounted to at least one of the respective first bulkhead and a second bulkhead by a bellows forming an annular seal between the respective bulkhead and the outer duct.

12 Claims, 5 Drawing Sheets

(56) References Cited

U.S. PATENT DOCUMENTS

| | | | |
|---|---|---|---|
| 8,308,110 B2 * | 11/2012 | Porte | F02C 7/28 |
| | | | 244/134 B |
| 8,382,039 B2 | 2/2013 | Calder | |
| 8,678,319 B2 | 3/2014 | Todorovic | |
| 9,255,523 B2 | 2/2016 | Todorovic et al. | |
| 9,528,442 B2 * | 12/2016 | Trinh | F02C 7/047 |
| 9,849,992 B2 | 12/2017 | Goodman et al. | |
| 9,950,799 B2 | 4/2018 | Anderson et al. | |
| 9,982,628 B2 * | 5/2018 | Roberge | F01D 25/08 |
| 2009/0152401 A1 | 6/2009 | Sternberger | |
| 2009/0314899 A1 * | 12/2009 | Porte | C04B 28/006 |
| | | | 244/53 B |
| 2014/0263837 A1 | 9/2014 | Sternberger | |
| 2015/0176490 A1 | 6/2015 | Trinh | |
| 2018/0016982 A1 | 1/2018 | Wotzak | |

* cited by examiner

ANTI-ICING SYSTEM FOR AN AIRCRAFT NACELLE

BACKGROUND

1. Technical Field

This disclosure relates generally to aircraft gas turbine engine nacelles, and more particularly to nacelle anti-ice systems.

2. Background Information

During aircraft operations, atmospheric conditions may lead to the formation of ice on the surfaces of the aircraft. Ice formation on aircraft surfaces, such as on the inlet of a gas turbine engine nacelle, is undesirable and can lead to potentially hazardous flying conditions. For example, the formation of ice on aircraft surfaces may reduce the performance of the aircraft by increasing weight or affecting aerodynamic properties of the aircraft. Further, ice formations on the aircraft's surfaces may be drawn through the aircraft's gas turbine engines.

To address the above concerns, aircraft may include anti-icing systems to prevent ice formation on, or to remove ice from, aircraft surfaces. One method of implementing such anti-icing systems is to direct heated gases from the gas turbine engine (e.g., engine bleed air) to interior or exterior surfaces of the aircraft, thereby increasing the temperature of the targeted aircraft surface. Similar anti-icing systems may use a double duct system to transmit heated gases from the gas turbine engine to the targeted aircraft surface while minimizing the risk of damage to aircraft components (e.g., acoustic composite structure of the gas turbine engine) as a result of a burst duct.

However, use of double duct anti-icing systems can present a number of complications. The anti-icing systems may require complicated seal arrangements (e.g., high-temperature sliding seals) to couple the outer duct to support structures within the gas turbine engine nacelle. Such seal arrangements are heavy and provide limited responsiveness to vibration and deflection. Inner and outer ducts may also experience different rates and extents of thermal expansion. Additionally, the use of complicated seal arrangements may limit possible orientations of the inner and outer ducts with respect to support structures within the gas turbine engine nacelle.

SUMMARY

According to an aspect of the present disclosure, an anti-icing system for an aircraft nacelle includes an inner duct and an outer duct. The inner duct extends through a first bulkhead between a gas turbine engine and a plenum of the nacelle. The inner duct is configured to deliver heated gases from the gas turbine engine to the plenum. The outer duct includes a first end and a second end. The outer duct circumferentially encompasses at least a portion of the inner duct on a first side of the bulkhead. At least one of the first end and the second end of the outer duct is mounted to at least one of the respective first bulkhead and a second bulkhead by a bellows forming an annular seal between the respective bulkhead and the outer duct.

In the alternative or additionally thereto, in the foregoing aspect, the bellows is configured to mount at least one of the first end and the second end of the outer duct to at least one of the respective first bulkhead and the second bulkhead so as to form a cant angle of the outer duct with respect to at least one of the respective first bulkhead and the second bulkhead.

In the alternative or additionally thereto, in the foregoing aspect, the cant angle of the outer duct with respect to at least one of the first bulkhead and the second bulkhead is between zero and forty-five degrees.

In the alternative or additionally thereto, in the foregoing aspect, the second end of the outer duct is mounted to the second bulkhead.

In the alternative or additionally thereto, in the foregoing aspect, the anti-icing system further includes at least one link configured to support the inner duct on a second side of the first bulkhead, opposite the first side.

In the alternative or additionally thereto, in the foregoing aspect, the at least one link is configured to prevent contact between the inner duct and the outer duct.

In the alternative or additionally thereto, in the foregoing aspect, the bellows is made of INCONEL.

In the alternative or additionally thereto, in the foregoing aspect, the at least one link couples the inner duct to a fixed structure.

In the alternative or additionally thereto, in the foregoing aspect, the at least one link is mounted to at least one of the fixed structure and the inner duct by at least one spherical bushing.

In the alternative or additionally thereto, in the foregoing aspect, the at least one link is configured to be variably adjusted in length.

According to another aspect of the present disclosure, an anti-icing system for an aircraft nacelle includes an inner duct and an outer duct. The inner duct extends through a first bulkhead between a gas turbine engine and a plenum of the nacelle. The inner duct is configured to deliver heated gases from the gas turbine engine to the plenum. The outer duct includes a first end and a second end. The outer duct circumferentially encompasses at least a portion of the inner duct on a first side of the bulkhead. The inner duct is supported by at least one link on a second side of the first bulkhead, opposite the first side.

In the alternative or additionally thereto, in the foregoing aspect, at least one of the first end and the second end of the outer duct is mounted to at least one of the respective first bulkhead and the second bulkhead by a bellows forming an annular seal between the respective bulkhead and the outer duct.

In the alternative or additionally thereto, in the foregoing aspect, the bellows is configured to mount at least one of the first end and the second end of the outer duct to at least one of the respective first bulkhead and the second bulkhead so as to form a cant angle of the outer duct with respect to at least one of the respective first bulkhead and the second bulkhead.

In the alternative or additionally thereto, in the foregoing aspect, the at least one link couples the inner duct to a fixed structure.

In the alternative or additionally thereto, in the foregoing aspect, the at least one link is mounted to at least one of the fixed structure and the inner duct by at least one spherical bushing.

In the alternative or additionally thereto, in the foregoing aspect, the at least one link is configured to be variably adjusted in length.

According to another aspect of the present disclosure, an anti-icing system for an aircraft nacelle includes an inner duct and an outer duct. The inner duct extends through a first bulkhead between a gas turbine engine and a plenum of the nacelle. The inner duct is configured to deliver heated gases from the gas turbine engine to the plenum. The outer duct includes a first end and a second end. The outer duct circumferentially encompasses at least a portion of the inner duct on a first side of the first bulkhead. At least one of the first end and the second end of the outer duct is mounted to at least one of the respective first bulkhead and a second bulkhead by a bellows forming an annular seal between the respective bulkhead and the outer duct. The inner duct is supported by at least one link on a second side of the first bulkhead, opposite the first side.

In the alternative or additionally thereto, in the foregoing aspect, the bellows is configured to mount at least one of the first end and the second end of the outer duct to at least one of the respective first bulkhead and the second bulkhead so as to form a cant angle of the outer duct with respect to at least one of the respective first bulkhead and the second bulkhead.

In the alternative or additionally thereto, in the foregoing aspect, the cant angle of the outer duct with respect to at least one of the first bulkhead and the second bulkhead is between zero and forty-five degrees.

In the alternative or additionally thereto, in the foregoing aspect, the at least one link is configured to be variably adjusted in length.

The present disclosure, and all its aspects, embodiments and advantages associated therewith will become more readily apparent in view of the detailed description provided below, including the accompanying drawings.

DETAILED DESCRIPTION

It is noted that various connections are set forth between elements in the following description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

Figure 1:
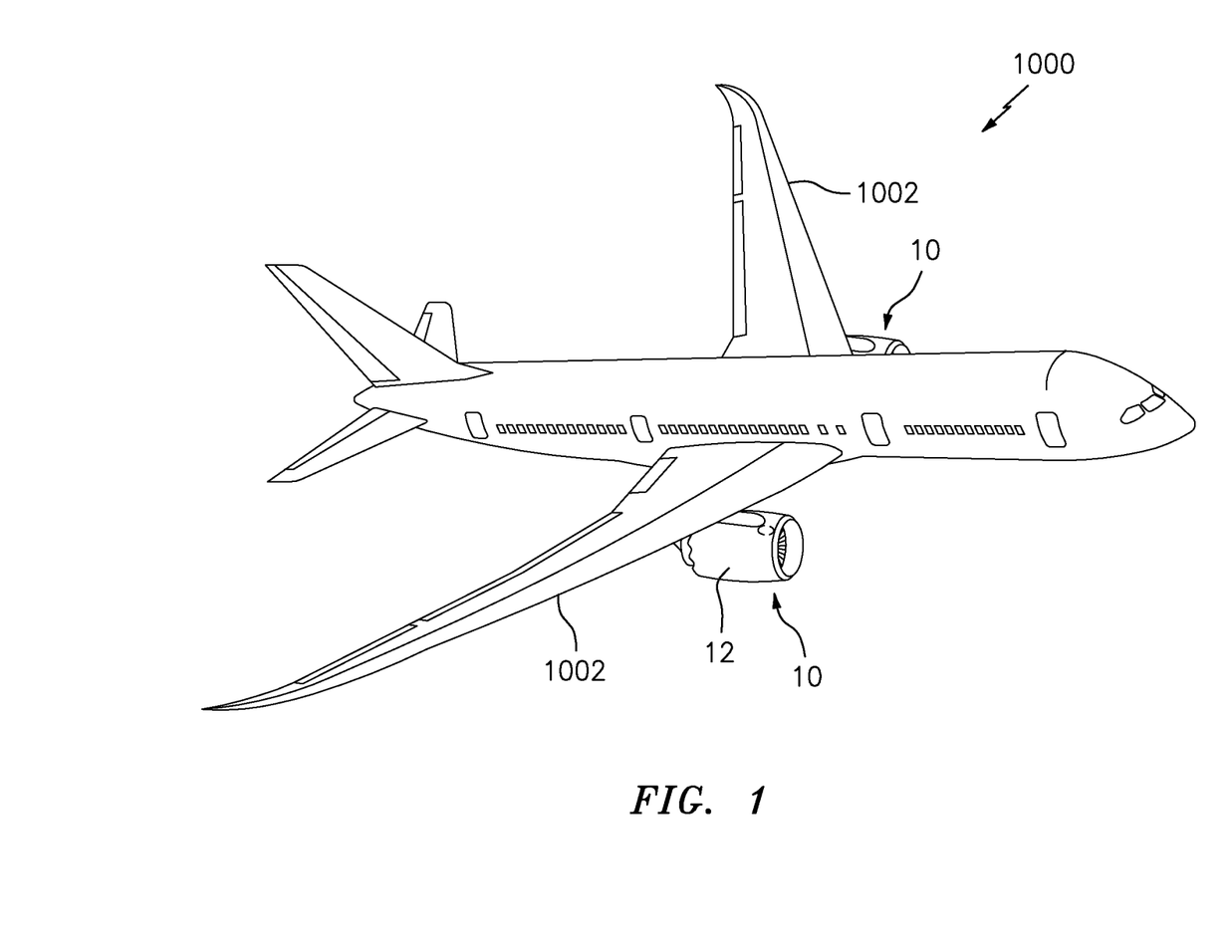
FIG. 1 is a perspective view of an aircraft including a gas turbine engine.
Figure 2:
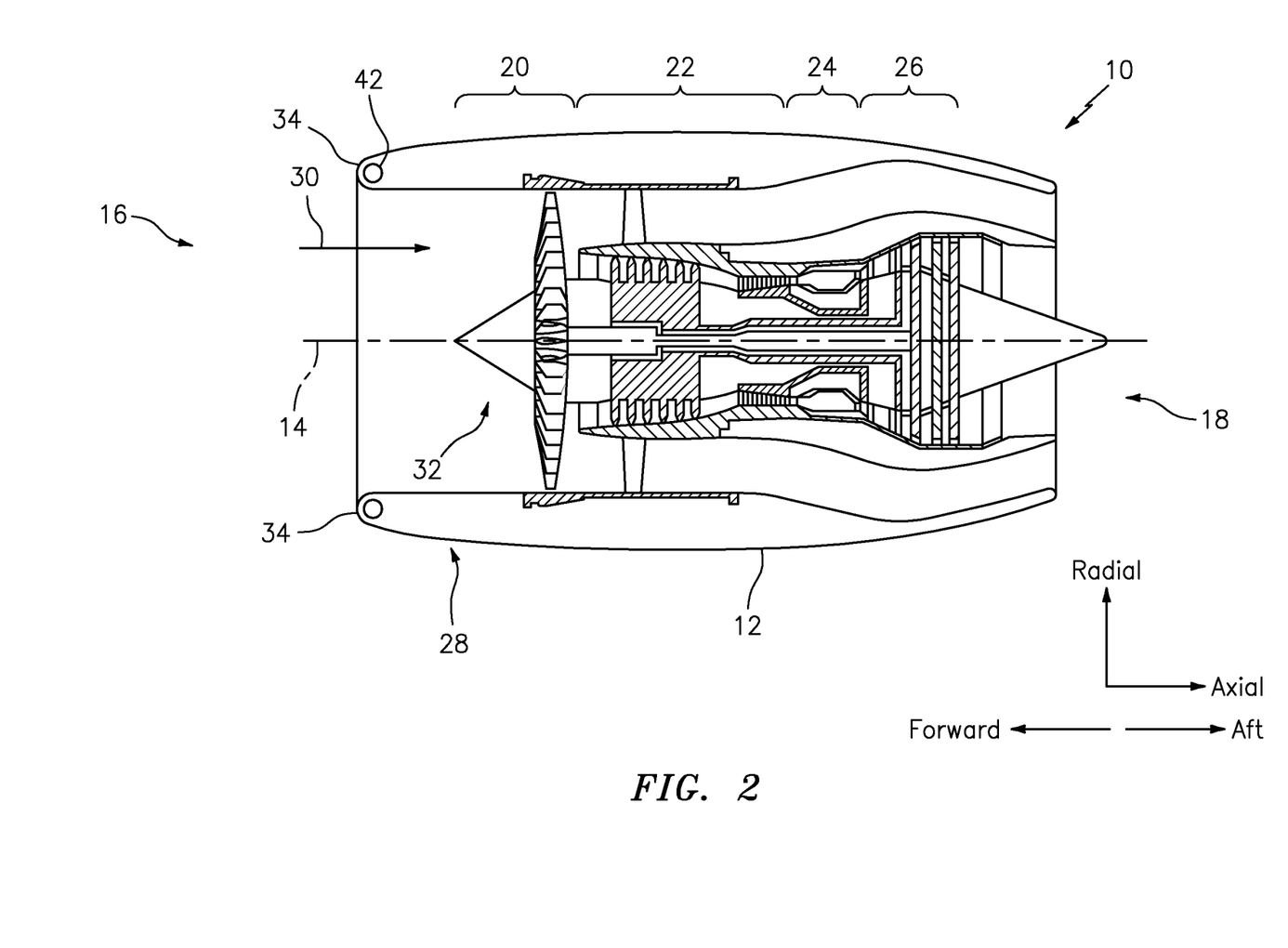
FIG. 2 is a side, cross-sectional view of a gas turbine engine.

Referring to FIGS. 1 and 2, an aircraft 1000 includes a gas turbine engine 10 mounted to, for example, a wing 1002 of the aircraft 1000. The gas turbine engine 10 includes a nacelle 12 defining a housing of the gas turbine engine 10 about a longitudinal axis 14. The longitudinal axis 14 extends through the center of the gas turbine engine 10 between a forward end 16 and an aft end 18 of the gas turbine engine 10. The gas turbine engine 10 generally includes a fan section 20, a compressor section 22, a combustor section 24, and a turbine section 26. The nacelle 12 includes an inlet surface 28 for directing air flow 30 toward the fan section 20 through an inlet section 32. Because the inlet surface 28 is located at the forward end 16, and therefore not heated directly by the gas turbine engine 10, the inlet surface 28 is prone to the accumulation of ice, especially along its forward lip surface 34 (i.e., the leading edge of the nacelle 12).

Figure 3:
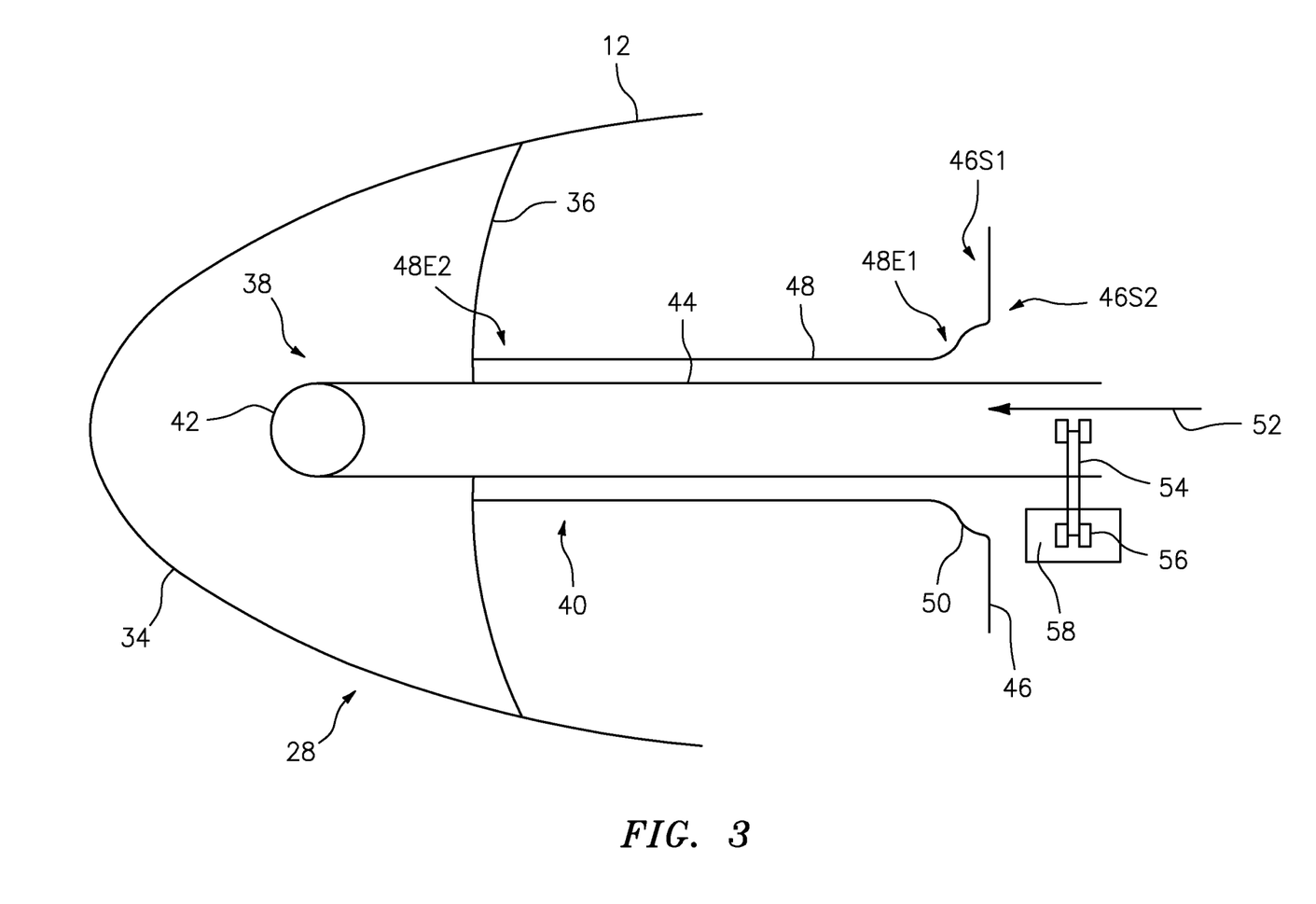
FIG. 3 is a side, cross-sectional view of an exemplary anti-icing system of the gas turbine engine of FIG. 2.

Referring to FIGS. 2 and 3, the nacelle 12 includes a forward bulkhead 36 annularly arranged about the longitudinal axis 14. The inlet surface 28 and the forward bulkhead 36 define a forward plenum 38 housing portions of an anti-icing system 40. The anti-icing system 40 is configured to deliver heated gases 52 (e.g., bleed air from the compressor section 22 of the gas turbine engine 10) to the forward plenum 38 to prevent the formation of ice on the forward lip surface 34.

The anti-icing system 40 includes a distribution ring 42 disposed within the forward plenum 38 and annularly arranged about the longitudinal axis 14. An inner duct 44 is configured to deliver heated gases 52 from the gas turbine engine 10 to the forward plenum 38 via the distribution ring 42 (e.g., through the forward bulkhead 36). The distribution ring 42 may be configured as a piccolo tube or any other suitable configuration for directing heated gases 52 to nacelle 12 surfaces. For example, the inner duct 44 may extend between an engine build-up (EBU) outlet of the gas turbine engine 10 and the distribution ring 42. The distribution ring 42, in turn, distributes the hot gases within the forward plenum 38 thereby heating the forward lip surface 34 of the nacelle 12 to prevent formation of ice on the forward lip surface 34. The inner duct 44 may pass through one or more bulkheads along its length of travel between the gas turbine engine 10 and the distribution ring 42. For example, the inner duct 44 may pass through an aft bulkhead 46 and the forward bulkhead 36. While the bulkheads 36, 46 are referred to herein as the forward bulkhead 36 and the aft bulkhead 46, it should be understood that bulkheads, such as bulkheads 36, 46, can have any orientation with respect to one another.

The anti-icing system 40 includes an outer duct 48 circumferentially encompassing at least a portion of the inner duct 44. For example, the outer duct 48 may encompass the length of the inner duct 44 between the forward bulkhead 36 and the aft bulkhead 46. This configuration allows the outer duct 48 to contain heated gases 52 from the gas turbine engine 10 as a result of a burst inner duct 44. The configuration further allows the inner duct 44 to continue directing heated gases 52 to the forward plenum 38 notwithstanding a burst inner duct 44. The outer duct 48 may be substantially parallel to the inner duct 44 along the length of the inner duct 44 encompassed by the outer duct 48 (e.g., to form a void between the inner duct 44 and the outer duct 48 while preventing contact between the ducts 44, 48 due to, for example, vibration and thermal expansion and contraction).

In some embodiments, a first end 48E1 of the outer duct 48 is mounted to the aft bulkhead 46 on a first side 46S1 of the aft bulkhead 46 by a bellows 50. The bellows 50 forms an annular seal between the aft bulkhead 46 and the outer duct 48. For example, the bellows 50 may be welded to one or both of the aft bulkhead 46 and the outer duct 48 about the circumference of the bellows 50. The bellows 50 may be configured to accommodate vibration, lateral deflection, and thermal expansion and contraction of the outer duct 48 and one or both of the bulkheads 36, 46. In some embodiments, the bellows 50 may be INCONEL, titanium, or any other material suitable for high-temperature and/or high-pressure applications.

In some embodiments, a second end 48E2 of the outer duct 48 is mounted to a second bulkhead, such as the forward bulkhead 36. In such a configuration, the inner duct 44, the outer duct 48, and the bellows 50 may form an enclosed annular void between the forward bulkhead 36 and the aft bulkhead 46. In some embodiments, the bellows 50 may mount the second end 48E2 of the outer duct 48 to the forward bulkhead 36. In some other embodiments, the bellows 50 may include more than one bellows 50 which mount the first end 48E1 and the second end 48E2 of the outer duct 48 to the aft bulkhead 46 and the forward bulkhead 36, respectively.

Figure 3A:
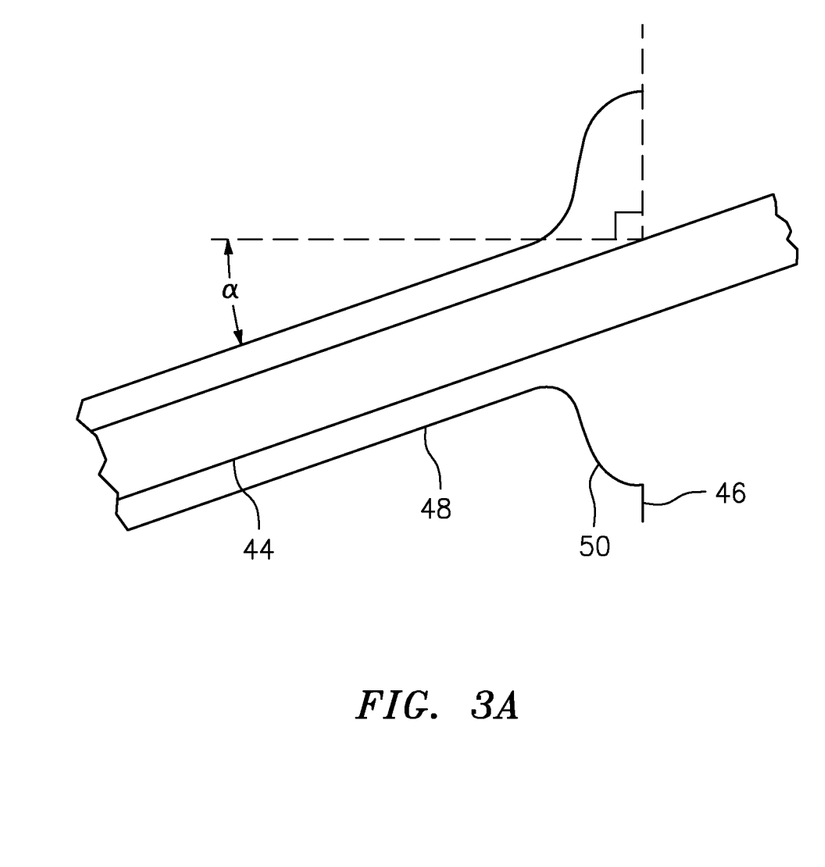
FIG. 3A is a side-cross sectional view of another exemplary anti-icing system of the gas turbine engine of FIG. 2.

Referring to FIG. 3A, in some embodiments, the bellows 50 may be configured to provide angularity between the ducts 44, 48 and one or more of the forward bulkhead 36 and the aft bulkhead 46 (e.g., to orient the inner duct 48 within the inlet surface 28 of the nacelle 12 as the inlet surface 28 narrows, radially, proximate the forward lip surface 34. For example, the outer duct 48, and correspondingly the inner duct 44, may be described as "canted" (i.e., oriented at a non-perpendicular cant angle α) relative to the orientation of the aft bulkhead 46 (e.g., radial or non-radial with respect to longitudinal axis 14). The cant angle α of the outer duct 48 with respect to the aft bulkhead 46 may be between 0 and 20 degrees. However, in some embodiments, the cant angle α of the outer duct 48 with respect to the aft bulkhead 46 may be between 0 and 45 degrees.

Figure 4:
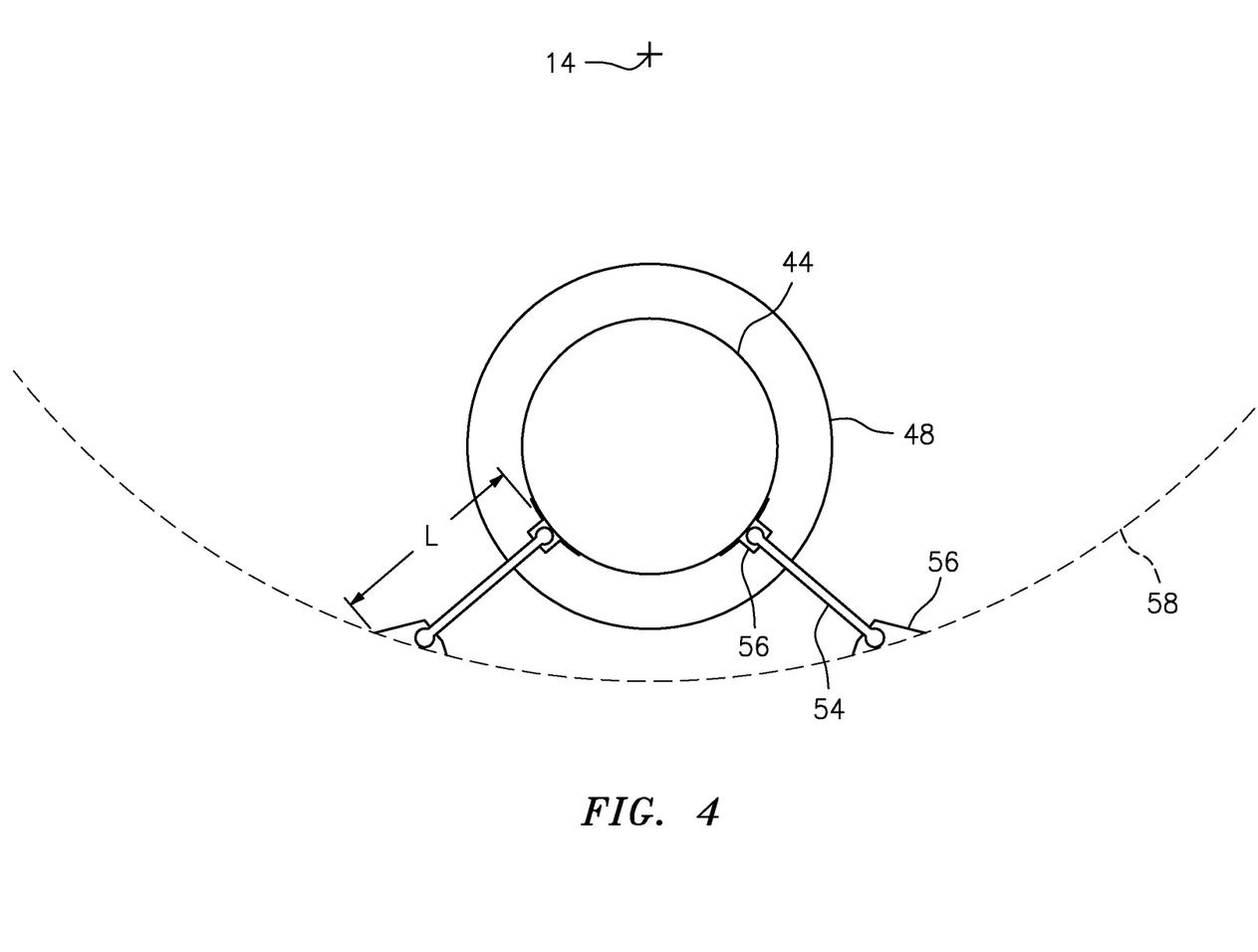
FIG. 4 is an aft-end view of the anti-icing system of FIG. 3.

Referring to FIGS. 3 and 4, in some embodiments, the anti-icing system 40 includes at least one link 54 configured to support the inner duct 44. The at least one link 54 couples the inner duct 44 to a fixed structure 58 of the gas turbine engine 10 (e.g., the nacelle 12 or an engine attach ring). For example, the at least one link 54 may be mounted between the inner duct 44 and the fixed structure 58 at mounts 56 on a second side 46S2 of the aft bulkhead 46 (e.g., aft of the aft bulkhead 46). The mount 56 between the at least one link 54 and the fixed structure 58 may be oriented in any suitable direction (e.g., axially, radially, etc.). The mounts 56 may be configured to permit relative motion between the inner duct 44 and the fixed structure 58. The at least one link 54 may be any number of links (e.g., 1, 2, 3, 4, or more) necessary for support of the inner duct 48. Additionally, the at least one link 54 may be used independently or in combination with the bellows 50.

The at least one link 54 may support and/or allow movement of the inner duct 44 in one or more of a radial, lateral, or axial direction. For example, the at least one link 54 may allow the inner duct 44 to share thermal growth with EBU ducting aft of the inner duct 44 (e.g., by allowing the inner duct 44 to move forward or aft (e.g., axially), for example, as the EBU ducting expands or contracts). Additionally, the at least one link 54 may allow thermal growth of the inner duct 44 without restricting or binding. The at least one link 54 may also reduce movement of the inner duct 44 as a result of vibration or lateral forces acting on the inner duct 44. For example, in some embodiments, the at least one link 54 may prevent or reduce deflection of the bellows 50 as a result of lateral loads on the inner duct 44. Accordingly, the at least one link 54 may prevent the inner duct 44 from contacting other components, such as the outer duct 48, thereby preventing or minimizing wear of the inner duct 44. In some embodiments, one or more of the mounts 56 of the at least one link 54 may include spherical bushings.

In some embodiments, the at least one link 54 may have a fixed length L. In other embodiments, the at least one link 54 may be configured to be variably adjusted in length L (i.e., between the inner duct 44 and the fixed structure 58). For example, the length L of the at least one link 54 may be adjusted to minimize or eliminate preloading stress on the inner duct 44. In some embodiments, one or more of the at least one link 54 may have a different length L than another of the at least one link 54.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. Accordingly, the present disclosure is not to be restricted except in light of the attached claims and their equivalents.

What is claimed is:

1. An anti-icing system for an aircraft nacelle comprising:
   an inner duct extending through a first bulkhead between a gas turbine engine and a plenum of the nacelle, the inner duct configured to deliver heated gases from the gas turbine engine to the plenum;
   an outer duct comprising a first end and a second end, the outer duct circumferentially encompassing at least a portion of the inner duct on a first side of the first bulkhead; and
   wherein the first end of the outer duct is mounted to the first bulkhead by a bellows forming an annular seal between the first bulkhead and the outer duct and the second end of the outer duct is mounted to a second bulkhead; and
   at least one link comprising a first link end connected to the inner duct at a first mount with a first spherical bearing and a second link end connected to a fixed structure axially spaced aft of the first bulkhead at a second mount with a second spherical bushing;
   wherein the outer duct is radially spaced from the inner duct along an axial length extending from the first bulkhead to the second bulkhead.

2. The system of claim 1, wherein the bellows is configured to mount the first end of the outer duct to the first bulkhead so as to form a cant angle of the outer duct with respect to the first bulkhead.

3. The system of claim 2, wherein the cant angle of the outer duct with respect to the first bulkhead is between zero and forty-five degrees.

4. The system of claim 1, wherein the at least one link is configured to be variably adjusted in length.

5. An anti-icing system for an aircraft nacelle comprising:
   an inner duct extending through a first bulkhead between a gas turbine engine and a plenum of the nacelle, the inner duct configured to deliver heated gases from the gas turbine engine to the plenum; and
   an outer duct comprising a first end and a second end, the outer duct circumferentially encompassing at least a portion of the inner duct on a first side of the first bulkhead;
   wherein the inner duct is supported by at least one link on a second side of the first bulkhead, opposite the first side, the at least one link comprising a first link comprising a first link end connected to the inner duct at a first mount and a second link end connected to a fixed structure axially spaced aft of the first bulkhead at a second mount, the at least one link further comprising a second link comprising a third link end connected to the inner duct at a third mount, circumferentially spaced from the first mount, and a fourth link end connected to the fixed structure axially spaced aft of the first bulkhead at a fourth mount;

wherein the first end of the outer duct is mounted to the first bulkhead by a bellows forming an annular seal between the first bulkhead and the outer duct and the second end of the outer duct is mounted to a second bulkhead; and wherein the outer duct is radially spaced from the inner duct along an axial length extending from the first bulkhead to the second bulkhead.

6. The system of claim 5, wherein the bellows is configured to mount the first end of the outer duct to the first bulkhead so as to form a cant angle of the outer duct with respect to the first bulkhead.

7. The system of claim 5, wherein both of the first mount and the second mount include a spherical bushing.

8. The system of claim 5, wherein the at least one link is configured to be variably adjusted in length.

9. An anti-icing system for an aircraft nacelle comprising:

an inner duct extending through a first bulkhead between a gas turbine engine and a plenum of the nacelle, the inner duct configured to deliver heated gases from the gas turbine engine to the plenum;

an outer duct comprising a first end and a second end, the outer duct circumferentially encompassing at least a portion of the inner duct on a first side of the first bulkhead; and at least one link comprising a first link end connected to the inner duct at a first mount with a first spherical bearing and a second link end connected to a fixed structure axially spaced aft of the first bulkhead at a second mount with a second spherical bushing;

wherein at least one of the first end and the second end of the outer duct is mounted to at least one of the respective first bulkhead and a second bulkhead by a bellows forming an annular seal between the respective bulkhead and the outer duct;

wherein the outer duct is radially spaced from the inner duct along an axial length extending from the first bulkhead to the second bulkhead.

10. The system of claim 9, wherein the bellows is configured to mount at least one of the first end and the second end of the outer duct to at least one of the respective first bulkhead and the second bulkhead so as to form a cant angle of the outer duct with respect to at least one of the respective first bulkhead and the second bulkhead.

11. The system of claim 10, wherein the cant angle of the outer duct with respect to at least one of the first bulkhead and the second bulkhead is between zero and forty-five degrees.

12. The system of claim 9, wherein the at least one link is configured to be variably adjusted in length.

\* \* \* \* \*